(12) United States Patent
Bernreitner et al.

(10) Patent No.: US 9,920,195 B2
(45) Date of Patent: Mar. 20, 2018

(54) THERMOPLASTIC POLYOLEFIN COMPOSITION

(71) Applicant: Borealis AG, Vienna (AT)

(72) Inventors: Klaus Bernreitner, Linz (AT); Claudia Kniesel, Loending (AT); Robert Gubo, Waizenkirchen (AT); Klaus Maureder, Hörsching (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/308,384

(22) Filed: Jun. 18, 2014

(65) Prior Publication Data

US 2014/0303325 A1  Oct. 9, 2014

Related U.S. Application Data

(62) Division of application No. 13/263,249, filed as application No. PCT/EP2010/054514 on Apr. 6, 2010.

(30) Foreign Application Priority Data

Apr. 9, 2009  (EP) .................................... 09157719

(51) Int. Cl.
| | | |
|---|---|---|
| *C08L 23/04* | (2006.01) | |
| *C08L 23/06* | (2006.01) | |
| *C08L 23/10* | (2006.01) | |
| *C08L 23/16* | (2006.01) | |
| *C08L 47/00* | (2006.01) | |

(52) U.S. Cl.
CPC ............... *C08L 47/00* (2013.01); *C08L 23/04* (2013.01); *C08L 23/06* (2013.01); *C08L 23/10* (2013.01); *C08L 23/16* (2013.01); *C08L 2666/02* (2013.01); *C08L 2666/06* (2013.01)

(58) Field of Classification Search
CPC .......... C08L 23/04; C08L 23/06; C08L 23/10; C08L 23/16; C08L 47/00; C08L 2666/06; C08L 2666/02
USPC ........................................................ 524/528
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,363,885 A | 12/1982 | Fukui et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 5,086,109 A | 2/1992 | Ueno et al. |
| 5,110,685 A | 5/1992 | Cross et al. |
| 5,539,067 A | 7/1996 | Parodi et al. |
| 5,618,771 A | 4/1997 | Parodi et al. |
| 6,391,977 B1 | 5/2002 | Yu et al. |
| 2002/0061976 A1 | 5/2002 | Krabbenborg et al. |
| 2005/0154134 A1 | 7/2005 | Patel et al. |
| 2006/0142495 A1 | 6/2006 | Lalho et al. |
| 2006/0173089 A1* | 8/2006 | Jackson ................... C08L 23/00 522/109 |
| 2010/0047599 A1* | 2/2010 | Kvamme et al. ............. 428/523 |
| 2011/0123745 A1 | 5/2011 | Ek et al. |

FOREIGN PATENT DOCUMENTS

| | | |
|---|---|---|
| EA | 10753 | 10/2007 |
| EP | 07782 | 2/1980 |
| EP | 45977 | 2/1982 |
| EP | 45975 | 3/1982 |
| EP | 45976 | 3/1982 |
| EP | 0688794 | 12/1995 |
| EP | 1401894 | 3/2004 |
| EP | 1688458 A1 | 8/2006 |
| WO | 87/07620 | 12/1987 |
| WO | 92/12182 | 7/1992 |
| WO | 92/19653 | 11/1992 |
| WO | 92/19658 | 11/1992 |
| WO | 92/19659 | 11/1992 |
| WO | 92021705 | 12/1992 |
| WO | 93/11165 | 6/1993 |
| WO | 93/11166 | 6/1993 |
| WO | 93/19100 | 9/1993 |
| WO | 95/32994 | 12/1995 |
| WO | 96/18662 | 6/1996 |
| WO | 97/36939 | 10/1997 |
| WO | 97/44371 | 11/1997 |
| WO | 98/12234 | 3/1998 |
| WO | 99/33842 | 7/1999 |
| WO | 03/00754 | 1/2003 |
| WO | 03/00755 | 1/2003 |
| WO | 03/00756 | 1/2003 |
| WO | 03/00757 | 1/2003 |
| WO | 2004/029112 | 4/2004 |
| WO | 2006/38084 | 4/2006 |
| WO | 2007/034915 | 3/2007 |
| WO | 2008/006586 | 1/2008 |
| WO | WO 2008006586 A1 * | 1/2008 |

OTHER PUBLICATIONS

Busico, V., et al., "Microstructure of Polypropylene", Prog. Polym. Sci. 26 (2001) 443-533.

(Continued)

*Primary Examiner* — Angela C Scott
(74) *Attorney, Agent, or Firm* — Tarolli, Sundheim, Covell & Tummion LLP

(57) ABSTRACT

Composition comprising a polypropylene matrix (M-PP), at least one elastomeric copolymer (EP), a high density polyethylene (HDPE) being bimodal or multimodal, and a filler (F).

3 Claims, No Drawings

(56) References Cited

OTHER PUBLICATIONS

Berger, S., et al., NMR Experiments: A Pracitcal Course, 2004, Wiley-VCH, Weinheim.
Russian Office Action, dated Jun. 25, 2013.
Indian Office Action, dated Jun. 13, 2016.
U.S. Office Action dated Sep. 9, 2014.

* cited by examiner

THERMOPLASTIC POLYOLEFIN COMPOSITION

The present application is directed to a new composition comprising a heterophasic polypropylene, a filler, and a polyethylene, as well as to its manufacture and use.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or a ethylene propylene diene monomer polymer (EPDM). Further the heterophasic polypropylene contains a crystalline polyethylene to some extent. In the automotive industry such heterophasic polypropylenes grades contain an amount of about 30 wt.-% propylene copolymer rubber, which normally is produced directly in one or two gas phase reactors or added externally to the matrix via a compounding step. These materials are normally used in combination with 10 to 20 wt.-% filler, like talcum, which overall leads to materials offering a good balance of stiffness and impact strength.

Especially the low temperature impact strength is seen as a key property since cars are used during the whole year and in different climate zones. During winter times the danger of breakage is unacceptably high if the impact strength, especially at −20° C. or lower, would be insufficient. More and more often there is the demand from the automotive industry for materials showing not only a good low temperature impact but an exceptional impact at very low temperatures, enabling the use of heterophasic material independently of the respective geographic circumstances. To be sure that these requirements are fulfilled the automobile industry asks for heterophasic polypropylene grades with very good impact strength measured at −40° C.

So far it was not possible to provide heterophasic polypropylenes with reasonable impact behavior at −40° C. without losing the stiffness. Main problem was that at these very low temperatures normal rubber modified polypropylene show already a poor impact performance since parts of the rubber phase (or all of it) is frozen in because the glass transition temperature of the rubbery phase is reached. For example, EP1401894 A1 discloses propylene polymers with improved properties, especially combining high stiffness and impact strength through a combination of polypropylene with selective β-nucleation, however not resulting in a sufficient impact strength at temperatures of −20° C. or below and furthermore suffering from a reduced thermomechanical stability resulting from a lower melting point of the β-modification. Also, U.S. Pat. No. 4,363,885 describes a propylene polymer composition useful for bumpers by combining a heterophasic polypropylene copolymer with EPR elastomer and talc filler, however requiring a special chamber kneader of the Banbury type for preparation due to the nature of the applied elastomer, and still not showing sufficient impact strength at temperatures below −30° C. Again, U.S. Pat. No. 5,086,109 covers a polypropylene resin composition based on polypropylene and further comprising a combination of EPR or EPDM with a hydrogenated block copolymer composed of both end blocks of an aromatic vinyl compound and an intermediate block of a conjugated diene polymer (styrene elastomer) as well as a flaky mineral filler, however not achieving a brittleness transition below −20° C. and requiring the use of the comparatively costly styrene elastomer component.

Thus the object of the present invention is to provide a heterophasic polypropylene being featured by good stiffness and excellent impact performance at very low temperatures, i.e. at temperatures far below −20° C., preferably below −30° C., like at −40° C.

The finding of the present invention is that the heterophasic polypropylene needs an additive which improves the dispersion of the rubber phase and simultaneously positively affects the impact behavior. More precisely the finding of the present invention is that a polyethylene of bimodal or multimodal character must be incorporated into the heterophasic polypropylene.

A further finding is that the incorporation can preferably be accomplished in case the polyethylene of bimodal or multimodal character is premixed with an elastomeric component before added to the heterophasic polypropylene.

Thus in a first aspect the present invention is directed to a composition (C) comprising
(a) a polypropylene matrix (M-PP),
(b) at least one elastomeric copolymer (EP) comprising units derived from
  (i) ethylene,
  (ii) at least one C3 to C20 α-olefin, and
  (iii) optionally a non-conjugated diene;
(c) a high density polyethylene (HDPE) being bimodal or multimodal, and
(d) a filler (F), like an inorganic filler (F).

The present invention comprises different polymer materials. However these materials are not crosslinked, for instance by the use of crosslinking agents.

Preferably the elastomeric copolymer(s) (EP), the high density polyethylene (HDPE) and the filler (F) are dispersed in said polypropylene matrix (M-PP). In other words the elastomeric copolymer(s) (EP) and the high density polyethylene (HDPE) form inclusions which are dispersed in the polypropylene matrix (M-PP). Thus the present invention is in particular directed to a so-called heterophasic system. Accordingly the present invention can be also defined as a heterophasic polypropylene composition (H-PP) comprising
(a) a polypropylene matrix (M-PP); and
(b) at least one elastomeric copolymer (EP), said elastomeric copolymer(s) (EP) comprise(s) units derived from
  (i) ethylene,
  (ii) at least one C3 to C20 α-olefin, and
  (iii) optionally a non-conjugated diene;
(c) a high density polyethylene (HDPE) being bimodal or multimodal; and
(d) a filler (F), like an inorganic filler (F).
wherein the elastomeric copolymer (EP) and the high density polyethylene (HDPE) form together or individually inclusions within the polypropylene matrix (M-PP).

In other words the polypropylene matrix (M-PP) contains (finely) dispersed inclusions being not part of the matrix and said inclusions contain either the elastomeric copolymer (EP) or the high density polyethylene (HDPE). The term "inclusion" according to this invention shall preferably indicate that the polypropylene matrix (M-PP) and the inclusion form different phases within the heterophasic polypropylene composition (H-PP), said inclusions are for instance visible by high resolution microscopy, like electron microscopy or scanning force microscopy.

Additionally the inclusions may also contain the filler (F); however preferably the filler (F) forms separate inclusions within the polypropylene matrix (M-PP). In another embodiment the polypropylene matrix (M-PP) contains (finely)

dispersed inclusions being not part of the matrix and said inclusions contain the elastomeric copolymer (EP) and the high density polyethylene (HDPE). In such a case the high density polyethylene (HDPE) may preferably form on its part inclusions (finely dispersed) within in the elastomeric copolymer (EP).

Preferably said composition (C), i.e. said heterophasic polypropylene composition (H-PP), comprises
(a) at least 36 wt.-%, like 36 to 81 wt.-%, preferably at least 45 wt.-%, like 45 to 72 wt.-%, of the polypropylene matrix (M-PP),
(b) at least 6 wt.-%, like 6 to 72 wt.-%, preferably at least 9 wt.-%, like 9 to 56 wt.-%, of elastomeric copolymer(s) (EP),
(c) at least 3 wt.-%, like 3 to 27 wt.-%, preferably at least 6 wt.-%, like 6 to 27 wt.-% or 6 to 18 wt.-%, more preferably at least 7 wt.-%, like 7 to 27 wt.-% or 7 to 18 wt.-%, of the high density polyethylene (HDPE), and
(d) at least 5 wt.-%; 5 to 20 wt.-%, preferably 8 to 15 wt.-%, of the filler (F), based on the total composition (C), more preferably based on the total sum of the polypropylene matrix (M-PP), elastomeric copolymer(s) (EP), the high density polyethylene (HDPE), and filler (F).

Thus in an especially preferred embodiment thecomposition (C), i.e. said heterophasic polypropylene composition (H-PP), comprises
(a) 45 to 72 wt.-%, of the polypropylene matrix (M-PP),
(b) 9 to 56 wt.-%, of elastomeric copolymer(s) (EP),
(c) 6 to 18 wt.-%, like 7 to 18 wt.-%, of the high density polyethylene (HDPE), and
(d) 8 to 15 wt.-%, of the filler (F), based on the total composition (C), more preferably based on the total sum of the polypropylene matrix (M-PP), elastomeric copolymer(s) (EP), the high density polyethylene (HDPE), and filler (F).

Due to the rather high amount of elastomeric copolymer(s) (EP) within the composition (C), i.e. within said heterophasic polypropylene composition (H-PP), the xylene soluble (XS) content of the composition (C), i.e. of said heterophasic polypropylene composition (H-PP), is also rather high, i.e. at least 12 wt.-%, more preferably in the range of 20 to 70 wt.-%, like 30 to 50 wt.-%.

Preferably the weight ratio between the high density polyethylene (HDPE) and the sum of the elastomeric copolymer(s) (EP) is from 1:10 to 2:1, preferably from 1:8 to 1:2.

More preferably the present composition (C), i.e. said heterophasic polypropylene composition (H-PP), comprises as polymer components only the polypropylene matrix (M-PP), the high density polyethylene (HDPE) and the elastomeric copolymer(s) (EP). In other words the composition (C), i.e. said heterophasic polypropylene composition (H-PP), may contain further additives and the filler (F) but no other polymer in an amount exceeding 5 wt-%, more preferably exceeding 3 wt.-%, like exceeding 1 wt.-%, based on the total composition (C). One additional polymer which may be present in such low amounts is a polyethylene which is a reaction product obtained by the preparation of one of the components used for the manufacture of the instant invention (see in detail below). Accordingly it is in particular appreciated that the instant composition (C) contains only the polypropylene matrix (M-PP), the high density polyethylene (HDPE), the elastomeric copolymer(s) (EP) and a polyethylene in amounts as mentioned in this paragraph.

Surprisingly it has been found out that the composition (C) of the instant invention can overcome the drawbacks of heterophasic systems known in the art. The new composition (C) shows excellent impact behavior at very low temperatures, i.e. at −40° C., without compromising the stiffness of the composition (C) (see table 1 to 3). Thus with the instant invention it is possible to provide automobile articles which can be applied also in regions with extreme weather conditions, especially in regions infested by extreme cold winters.

As stated above the high density polyethylene (HDPE) is bimodal or multimodal. More particularly the high density polyethylene (HDPE) is bimodal or multimodal in view of the molecular weight distribution and/or the comonomer content distribution. As will be explained in detail below the polypropylene matrix (M-PP) can be unimodal or multimodal, like bimodal in view of the molecular weight distribution and/or the comonomer content distribution.

Thus expression "multimodal" or "bimodal" used herein refers to the modality of the polymer, i.e.
the form of its molecular weight distribution curve, which is the graph of the molecular weight fraction as a function of its molecular weight,
and/or
the form of its comonomer content distribution curve, which is the graph of the comonomer content as a function of the molecular weight of the polymer fractions.

As will be explained below, the polypropylene matrix (M-PP) and/or the high density polyethylene (HDPE) can be produced by blending different polymer types, i.e. of different molecular weight and/or comonomer content. However it is preferred that the polymer components of the polypropylene matrix (M-PP) and/or of the high density polyethylene (HDPE) are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

In the following the individual components of the instant composition (C) will be defined in more detail.

The polypropylene matrix (M-PP) can be a propylene homopolymer (M-HoPP) or a propylene copolymer (M-CoPP).

However it is preferred that the propylene matrix (M-PP) is a propylene homopolymer (M-HoPP).

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

Where the polypropylene matrix (M-PP) is a propylene copolymer (M-CoPP), the propylene copolymer (M-CoPP) comprises units derived from at least one comonomer selected from the group consisting of ethylene and $C_4$ to $C_{20}$ α-olefin, preferably at least one comonomer selected from the group consisting of ethylene and $C_4$ to $C_{10}$ α-olefin, e.g. 1-butene or 1-hexene. Most preferably the propylene copolymer (M-CoPP) is a propylene ethylene copolymer. The comonomer content, like ethylene content, in the propylene copolymer (M-CoPP) is in such a case preferably relatively low, i.e. up to 5.0 wt.-%, more preferably 0.5 to 5.0 wt.-%, still more preferably 1.0 to 4.5 wt.-%, yet more preferably 2.0 to 4.0 wt.-%. Particularly the ethylene is the only comonomer in the propylene copolymer (M-CoPP).

In case the polypropylene matrix (M-PP) is a propylene homopolymer (M-HoPP), propylene homopolymer (M-HoPP) may be multimodal or bimodal in view of the molecular weight. In turn in case the polypropylene matrix (M-PP) is a propylene copolymer (M-CoPP), said propylene copolymer (M-CoPP) may be multimodal, like bimodal, in view of the comonomer content and/or molecular weight. It is in particular appreciated that the propylene copolymer (M-CoPP) is multimodal, like bimodal, in view of the comonomer content.

Further in case the polypropylene matrix (M-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the polypropylene matrix (M-PP). Accordingly in case of a bimodal system, in particular in view of the comonomer content, the split of the two fractions is roughly 50:50. Thus in one embodiment the polypropylene matrix (M-PP) comprises two fractions which differ in their comonomer content, like ethylene content, wherein the first fraction is present from 40 to 60 wt.-% and the second fraction from 60 to 40 wt.-%.

The difference of the comonomer content between the two fractions is defined in a way of a preferred embodiment in the following paragraph.

In cases where the polypropylene matrix (M-PP) is a propylene copolymer (M-CoPP), said propylene copolymer (M-CoPP) comprises at least two fractions that have different comonomer contents. Preferably the propylene copolymer (M-CoPP) comprises at least two fractions, more preferably consists of two fractions, that have a comonomer content, like ethylene content, which differ of at least 0.8 wt.-%, more preferably differ of at least 1.2 wt.-%. On the other hand the difference in the comonomer content in the two fractions should be not too high, i.e. not higher than 6.0 wt.-%, preferably not higher than 5.0 wt %, to avoid any separation tendencies. Thus it is appreciated that the propylene copolymer (M-CoPP) comprises at least two fractions, more preferably consists of two fractions, that have comonomer contents which differ of 2.0 to 6.0 wt.-%, more preferably of 2.5 to 5.0 wt.-%. Accordingly in one embodiment the propylene copolymer (M-CoPP) comprises, preferably consists of, a first fraction being a propylene homopolymer and a second fraction being a propylene copolymer having a comonomer content, preferably ethylene content, of at least 0.5 wt.-%, more preferably of at least 1.5 wt.-%, like of at least 2.0 wt.-%, e.g. of at least 2.5 wt.-%.

The polypropylene matrix (M-PP) may be produced in a polymerization stage effected in one or more polymerization reactors. Desirably the polypropylene matrix (M-PP) comprising two or more different propylene polymers may be produced by carrying out polymerization in two or more different polymerisation reactors (e.g. bulk and/or gas phase reactors; as bulk reactors, loop reactors are preferred) whereby to generate polymers of the different desired molecular weight distributions or monomer make ups in the different polymerization reactors.

Further and preferably the polypropylene matrix (M-PP) has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the polypropylene matrix (M-PP) has an $MFR_2$ (230° C.) in a range of 0.05 to 250.0 g/10 min, more preferably of 1.0 to 100.0 g/10 min, still more preferably of 2.0 to 50.0 g/10 min.

Preferably the polypropylene matrix (M-PP) is isotactic. Accordingly it is appreciated that the polypropylene matrix (M-PP) has a rather high pentad concentration, i.e. higher than 80%, more preferably higher than 85%, yet more preferably higher than 90%, still more preferably higher than 92%, still yet more preferably higher than 93%, like higher than 95%.

In case the polypropylene matrix (M-PP) is a propylene copolymer (M-CoPP) it is further appreciated that the units derived from $C_2$ to $C_{20}$ α-olefins other than propylene within the propylene copolymer (M-CoPP) are randomly distributed.

The second requirement of the instant invention is the presence of at least one elastomeric copolymer(s) (EP), preferably one or two elastomeric copolymer(s) (EP), in the inventive composition (C), i.e. in the heterophasic polypropylene composition (H-PP).

The elastomeric copolymer(s) (EP) comprises, preferably consists of, units derivable from ethylene and at least another C3 to C20 α-olefin, like C3 to C10 α-olefin, more preferably units derivable from ethylene and at least another α-olefin selected form the group consisting of propylene, 1-butene, 1-pentene, 1-hexene, 1-heptene and 1-octene. The elastomeric copolymer (EP) may additionally contain units derived from a non-conjugated diene, however it is preferred that the elastomeric copolymer consists of units derivable from ethylene and propylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer(s) (EP) comprise(s) at least units derivable from ethylene and propylene and may comprise other units derivable from a further α-olefin as defined in the previous paragraph. However it is in particular preferred that elastomeric copolymer(s) (EP) comprise(s) units only derivable from ethylene and propylene and optionally a non-conjugated diene as defined in the previous paragraph, like 1,4-hexadiene. Thus an ethylene propylene non-conjugated diene monomer polymer (EPDM) and/or an ethylene propylene rubber (EPR) as elastomeric copolymer(s) (EP) is/are especially preferred, the latter most preferred.

Like the polypropylene matrix (M-PP) the elastomeric copolymer(s) (EP) can be unimodal or multimodal, like bimodal. However it is preferred that the elastomeric copolymer(s) (EP) is/are unimodal. Concerning the definition of unimodal and multimodal, like bimodal, it is referred to the definition above.

In a specific embodiment of the present invention the instant composition (C), i.e. the heterophasic polypropylene composition (H-PP), comprises at least one elastomeric copolymer (EP1) and one elastomeric copolymer (EP2), said elastomeric copolymer (EP2) having a higher ethylene content than the elastomeric copolymer (EP1), resulting in a lower glass transition temperature for the elastomeric copolymer (EP2) as compared to the elastomeric copolymer (EP1). Thus in a preferred embodiment the elastomeric copolymer (EP1) has a glass transition temperature (point) being higher, i.e. being at least of 5° C. higher, i.e. being of 5 to 10° C. higher, compared to the elastomeric copolymer (EP2). Even more preferred the inventive composition (C), i.e. the heterophasic polypropylene composition (H-PP), comprises only two different elastomeric copolymers (EP), namely the elastomeric copolymer (EP1) and the elastomeric copolymer (EP2), but no other elastomeric copolymers (EP).

In circumstances where the inventive composition (C), i.e. the heterophasic polypropylene composition (H-PP), comprises (at least) two different elastomeric copolymers (EP) it is appreciated that the weight ratio between the elastomeric copolymer (EP1) and an elastomeric copolymer (EP2) is 18:1 to 1:9, more preferably 9:1 to 1:4.5. Thus in a specific embodiment the inventive composition (C), i.e. in the heterophasic polypropylene composition (H-PP), comprises from 4 to 36 wt.-%, preferably from 5 to 32 wt.-%, more preferably from 6 to 28 wt.-%, of the elastomeric copolymer (EP1) and from 2 to 36 wt.-%, preferably from 3 to 30 wt.-%, more preferably from 4 to 24 wt.-%, of the elastomeric copolymer (EP2).

Concerning the possible monomer units constituting the elastomeric copolymer (EP1) and the elastomeric copolymer (EP2) it referred to the definitions made for the elastomeric copolymer (EP). Preferably the elastomeric copolymer (EP2) has a higher overall comonomer content than the elastomeric copolymer (EP1), said overall comonomer content being the sum of ethylene content, $C_4$-$C_{20}$ α-olefin content and non-conjugated diene content.

Accordingly the elastomeric copolymer (EP1) comprises, preferably consists of, units derivable from propylene and at least another α-olefin selected from the group consisting of ethylene and C4 to C20 α-olefin, like C4 to C10 α-olefin, more preferably units derivable from propylene and at least another α-olefin selected form the group consisting of ethylene, 1-butene, 1-pentene, 1-hexene, 1-heptene and 1-octene. The elastomeric copolymer (EP1) may additionally contain units derived from a non-conjugated diene, however it is preferred that the elastomeric copolymer consists of units derivable from propylene and ethylene and/or C4 to C20 α-olefins only. Concerning possible non-conjugated dienes, if used, it is referred to list mentioned above.

Preferably the elastomeric copolymer (EP1) comprises at least units derivable from propylene and ethylene and may comprise other units derivable from a further α-olefin as defined in the previous paragraph. However it is in particular preferred that elastomeric copolymer (EP) comprises units only derivable from propylene and ethylene and optionally a non-conjugated diene as defined above, like 1,4-hexadiene. Thus an ethylene propylene non-conjugated diene monomer polymer (EPDM) or an ethylene propylene rubber (EPR) as elastomeric copolymer (EP1) is especially preferred, the latter most preferred.

The content of units derivable from propylene in the elastomeric copolymer (EP1) ranges from 30.0 to 80.0 wt.-%, more preferably 40.0 to 75.0 wt.-%. Thus in a specific embodiment the elastomeric copolymer (EP1) comprises from 20.0 to 70.0 wt.-%, more preferably 25.0 to 60.0 wt.-%, units derivable from ethylene. Preferably the elastomeric copolymer (EP1) is an ethylene propylene non-conjugated diene monomer polymer (EPDM) or an ethylene propylene rubber (EPR), the latter especially preferred, with a propylene content as defined in this paragraph.

The elastomeric copolymer (EP1) may be produced by conventional gas phase α-olefin polymerization techniques; however it is preferably produced using a supported catalyst system, e.g. a Ziegler Natta catalyst system or a metallocene catalyst system. More information about the preparation of the elastomeric copolymer (EP1) see below.

The elastomeric copolymer (EP2) comprises preferably units derived from ethylene, at least one C3 to C20 α-olefin and optionally a non-conjugated diene.

More precisely the elastomeric copolymer (EP2) comprises, preferably consists of, units derivable from ethylene and at least another C3 to C20 α-olefin, like C3 to C10 α-olefin, more preferably units derivable from ethylene and at least another α-olefin selected form the group consisting of propylene, 1-butene, 1-pentene, 1-hexene, 1-heptene and 1-octene. The elastomeric copolymer (EP2) may additionally contain units derived from a non-conjugated diene, however it is preferred that the elastomeric copolymer (EP2) consists of units derivable from ethylene and C3 to C20 α-olefins only. Concerning possible non-conjugated dienes, if used, it is referred to list mentioned above.

Preferably the elastomeric copolymer (EP2) comprises at least units derivable from ethylene and propylene and may comprise other units derivable from a further α-olefin as defined in the previous paragraph. However it is in particular preferred that elastomeric copolymer (EP2) comprises units only derivable from ethylene and propylene and optionally a non-conjugated diene as defined above, like 1,4-hexadiene. Thus an ethylene propylene non conjugated diene monomer polymer (EPDM) or an ethylene propylene rubber (EPR) as elastomeric copolymer (EP1) is especially preferred, the latter most preferred.

It is appreciated that units derivable from ethylene constitutes the main part within the elastomeric copolymer (EP2). Accordingly it is preferred that the content of units derivable from ethylene in the elastomeric copolymer (EP2) is more than 50.0 wt.-%, more preferably ranges from 50.0 to 70.0 wt.-%, more preferably 51.0 to 60.0 wt.-%. Preferably the elastomeric copolymer (EP2) with an ethylene content as defined in this paragraph is an ethylene propylene non conjugated diene monomer polymer (EPDM) or an ethylene propylene rubber (EPR), the latter especially preferred.

Further the density measured according to ISO 1183 of the elastomeric copolymer (EP2) shall preferably not exceed 900 kg/m$^3$, more preferably shall be in the range 850 to 900 kg/m$^3$, still more preferably in the range of 855 to 875 kg/m$^3$.

The elastomeric copolymer (EP2) may be produced by conventional solution or gas phase α-olefin polymerization techniques with homogeneous or heterogeneous catalysts.

Considering the information above, it is appreciated that the instant composition (C), i.e. the heterophasic polypropylene composition (H-PP), comprises (a) 36 to 81 wt.-%, preferably 45 to 72 wt.-%, of the polypropylene matrix (M-PP),
(b) 4 to 36 wt.-%, preferably 5 to 32 wt.-%, of elastomeric copolymer(s) (EP1),
(c) 2 to 36 wt.-%, preferably 4 to 24 wt.-%, of elastomeric copolymer(s) (EP2),
(d) 3 to 27 wt.-%, preferably 6 to 18 wt.-%, of the high density polyethylene (HDPE), and
(e) 5 to 20 wt.-%, more preferably 8 to 15 wt.-%, of the filler (F), based on the total composition (C), more preferably based on the total sum of the polypropylene matrix (M-PP), elastomeric copolymer (EP1), elastomeric copolymer (EP2), the high density polyethylene (HDPE), and filler (F), wherein the elastomeric copolymer(s) (EP1) and the elastomeric copolymer(s) (EP2) are chemically different.

A further essential aspect of the present invention is that the instant composition (C), i.e. in the heterophasic polypropylene composition (H-PP), comprises a specific high density polyethylene (HDPE).

By high density polyethylene (HDPE) according to this invention is meant a polyethylene with a density measured according to ISO 1183-187 of at least 940 kg/m$^3$, more preferably in the range of 940 to 960 kg/m$^3$, like 942 to 955 kg/m$^3$.

It is known from conventional polyethylene grades that they are suitable to improve to some extent the dispersion of the elastomeric components within the polymer matrix. Even though finely dispersed inclusions improve the impact behavior of a heterophasic system, it is still not possible to provide materials with excellent impact strength at very low temperatures, like −40° C. The main problem of such systems is still that the amorphous phase, here the phase containing the elastomeric copolymer(s) (EP) of the heterophasic system tends to crystallize at such low temperatures as the glass transition temperatures of the elastomeric components have been reached. It has been now surprisingly found that this problem can be overcome if a high density polyethylene (HDPE) being bimodal or multimodal in its molecular weight distribution and/or comonomer distribution is incorporated.

Accordingly the high density polyethylene (HDPE) comprises at least two fractions of different comonomer content and/or of different average weight molecular weight $M_w$.

Thus in a specific embodiment the high density polyethylene (HDPE) comprises, preferably consists of a fraction (A) and a fraction (B), said fraction (A) has a lower comonomer content and/or a lower weight average molecular weight $M_w$ measured according to ISO 16014 than fraction (B).

Accordingly the fraction (A) is a polyethylene homopolymer or a polyethylene copolymer with the proviso that in case the fraction (A) is a polyethylene copolymer that the comonomer content is preferably lower compared to the comonomer content of the fraction (B). In turn the fraction (B) may be also a polyethylene homopolymer or alternatively a polyethylene copolymer, the latter being preferred. In case the high density polyethylene (HDPE), i.e. the fraction (A) and/or the fraction (B), comprise(s) comonomers than it is appreciated that the comonomers are selected from the group consisting of 1-butene, 1-octene, 1-hexene and 4-methyl-penetene.

Thus the fraction (A) of the high density polyethylene (HDPE) is preferably defined as follows:

It is a polyethylene copolymer with a comonomer, like 1-butene or 1-hexene, content of 0.5 to 2.5 wt.-% or a polyethylene homopolymer, the latter being preferred. Further it is appreciated that the weight average molecular weight $M_w$ measured according to ISO 16014 of fraction (A) ranges from 10,000 to 50,000 g/mol, more preferably from 20,000 to 40,000 g/mol. It is further appreciated that the fraction (A) has a higher melt flow rate MFR$_2$ (190° C.) measured according to ISO 1133 compared to the fraction (B). Accordingly the MFR$_2$ (190° C.) measured according to ISO 1133 of fraction (A) is preferably from 50 to 1,000 g/10 min, more preferably from 200 to 800 g/10 min Additionally the density measured according to ISO 1183-187 of the fraction (A) is preferably higher compared to the density of fraction (B). Thus it is especially preferred that the fraction (A) has a density measured according to ISO 1183-187 in the range from 950 to 980 kg/m$^3$, more preferably from 955 to 956 kg/m$^3$.

On the other hand the fraction (B) of the high density polyethylene (HDPE) is preferably defined as follows:

It is a polyethylene homopolymer or a polyethylene copolymer with a comonomer, like 1-butene or 1-hexene, content of 1.5 to 4.5 wt.-%, the latter being preferred. Further it is appreciated that the weight average molecular weight $M_w$ measured according to ISO 16014 of fraction (B) ranges from 75,000 to 500,000 g/mol, more preferably from 90,000 to 300,000 g/mol. It is further appreciated that the fraction (B) has a MFR$_2$ (190° C.) measured according to ISO 1133 from 0.01 to 1.00 g/10 min, more preferably from 0.04 to 0.08 g/10 min Additionally the density measured according to ISO 1183-187 of the fraction (B) may range from 920 to 950 kg/m$^3$, more preferably from 925 to 940 kg/m$^3$.

The weight ratio between the fraction (A) and the fraction (B) of the high density polyethylene (HDPE) ranges from 70:30 to 30:70, more preferably 60:40 to 40:60.

Further the melt flow rate MFR$_2$ (190° C.) measured according to ISO 1133 of the high density polyethylene (HDPE) ranges from 0.1 to 7.0 g/10 min, preferably from 0.5 to 6.0 g/10 min and/or the melt flow rate ratio FRR (MFR$_{21}$ (190° C.)/MFR$_2$ (190° C.)) ranges from 20 to 150, more preferably from 40 to 90.

The weight average molecular weight $M_w$ measured according to ISO 16014 of the high density polyethylene (HDPE) is preferably in the range of 75.000 to 500.000 g/mol, preferably in the range of 90.000 to 300.000 g/mol. The molecular weight distribution (ratio of the weight average molecular weight ($M_w$) to the number average molecular weight ($M_n$)) ranges preferably from 5 to 80, more preferably from 8 to 60, like 12 to 45.

The total comonomer content other than ethylene of the high density polyethylene (HDPE) is preferably of 0.2 to 10 wt.-%, preferably 1.0 to 3.0 wt.-%, as measured by FTIR as defined in the example section.

Further the crystalline melting point of the high density polyethylene (HDPE) is preferably between 120 and 140° C., as determined by DSC analysis and the crystallinity of 60 to 90% as determined by DSC analysis.

Finally the instant composition (C), i.e. the heterophasic polypropylene composition (H-PP), must comprise a filler (F), preferably an inorganic filler (F). The filler (F) can be any filler as long as it has a positive effect on the impact properties of the final product, i.e. improves the impact behavior. Accordingly the filler (F) can be preferably an inorganic filler, having preferably a upper limit of the particle size distribution d95 of not more than 100 µm, more preferably not more than 60 µm. The "d" value is the diameter of the percentage of particles, e.g. d95 denotes that the diameter of 95% of the particles is not more than 100 µm. Typically the filler (F) has a surface area measured according to the commonly known BET method with $N_2$ gas as analysis adsorptive of less than 20 $m^2/g$, more preferably of less than 15 $m^2/g$, yet more preferably of less than 10 $m^2/g$. In some embodiments, the filler (F) shows a surface area of 7 $m^2/g$ or less. Filler (F) fulfilling these requirements are preferably anisotropic mineral fillers, like talc, mica and wollastonite. An especially preferred filler is talc.

The instant composition (C), i.e. the heterophasic polypropylene composition (H-PP), may additional contain typical other additives useful in the automobile sector, like carbon black, other pigments, antioxidants, UV stabilizers, nucleating agents, antistatic agents and slip agents, in amounts usual in the art.

A further finding of the present invention is that the instant composition (C), i.e. the heterophasic polypropylene composition (H-PP), is obtainable by a specific process. To obtain a sufficient dispersion of the high density polyethylene (HDPE) within the polypropylene matrix (M-PP) it has been found out that especially good results are achieved in case the high density polyethylene (HDPE) is premixed with an elastomeric polymer before added to the polypropylene matrix (M-PP). Accordingly the present invention is also directed to a composition (MB), i.e. masterbatch, comprising (a) at least one elastomeric copolymer (EP), preferably one elastomeric copolymer (EP), like an elastomeric copolymer (EP2), comprising units derived from
   (i) ethylene,
   (ii) at least one C3 to C20 α-olefin, and
   (iii) optionally a non-conjugated diene, and
(b) a high density polyethylene (HDPE) being bimodal or multimodal.

Preferably the weight ratio of the high density polyethylene (HDPE) and the elastomeric copolymer (EP) is from 60:40 to 20:80, more preferably 50:50 to 30:70. Such a ratio guaranties that the high density polyethylene (HDPE) is (finely) dispersed within the polypropylene matrix (M-PP).

The term "masterbatch" as used in the present invention indicates that composition (MB) contains a higher concentration of elastomeric copolymer (EP) and/or high density polyethylene (HDPE) than in the instant composition (C), i.e. the heterophasic polypropylene composition (H-PP).

The composition (MB), i.e. masterbatch, may contain typical additives and optionally the filler (F) in a concentration useful for the preparation of the instant composition (C), i.e. for the preparation of the heterophasic polypropylene composition (H-PP). Typically the composition (MB), i.e. the masterbatch, contains as polymer components only the elastomeric copolymer (EP) and the high density polyethylene (HDPE). Thus it is appreciated that the elastomeric copolymer (EP) and the high density polyethylene (HDPE) together constitutes at least 85 wt.-%, more preferably at least 90 wt.-% of the composition (MB), i.e. of the masterbatch.

The elastomeric copolymer (EP) is preferably the elastomeric copolymer (EP2) as defined above. Concerning the preferred embodiments of the high density polyethylene (HDPE) it is referred to the definition given above.

To produce the instant composition (C), i.e. the heterophasic polypropylene composition (H-PP), the composition (MB), i.e the masterbatch, is mixed, i.e. melt mixed or injection molded, with a heterophasic polypropylene (H-PP1) comprising
(a) a polypropylene matrix (M-PP) and
(b) at least one elastomeric copolymer (EP), preferably one elastomeric copolymer (EP), like an elastomeric copolymer (EP1), comprising units derived from
   (i) ethylene,
   (ii) at least one C3 to C20 α-olefin, and
   (iii) optionally a non-conjugated diene.

The filler (F) can be either premixed with the composition (MB), i.e. the masterbatch, or is added separately during the preparation of the heterophasic polypropylene (H-PP).

Accordingly the composition (C), i.e. the heterophasic polypropylene composition (H-PP), is in particular obtained by mixing, i.e. by melt mixing or by injection molding,
(a) 40 to 90 wt.-% preferably 50 to 80 wt.-%, of the heterophasic polypropylene (H-PP1);
(b) 5 to 45 wt.-%, preferably 10 to 30 wt.-%, of the composition (MB); and
(c) 5 to 20 wt.-%, preferably 8 to 15 wt.-%, of the filler (F).

The elastomeric copolymer (EP) of the heterophasic polypropylene (H-PP1) is preferably the elastomeric copolymer (EP1) as defined above. The polypropylene matrix (M-PP) of the heterophasic polypropylene (H-PP1) is the same as the polypropylene matrix (M-PP) defined for the instant composition (C), i.e. for the heterophasic polypropylene composition (H-PP).

It has been in discovered that mixing the composition (MB), i.e. the masterbatch, with a heterophasic polypropylene results in much better final properties of the instant composition (C), i.e. of the heterophasic polypropylene composition (H-PP), compared to a mixing of the composition (MB), i.e. the masterbatch, with a propylene homopolymer or propylene copolymer or compared to mixing the pure high density polyethylene (HDPE) with the heterophasic polypropylene (H-PP1).

The heterophasic polypropylene (H-PP1) used for the mixing with the composition (MB), i.e. the masterbatch, is preferably as follows:

Heterophasic polypropylene (H-PP1) comprising
(a) a polypropylene matrix (M-PP) and
(b) an elastomeric copolymer (EP), preferably a elastomeric copolymer (EP1), being dispersed in said matrix (M-PP), said elastomeric copolymer (EP), preferably said elastomeric copolymer (EP1), comprises units derived from
   (i) propylene,
   (ii) ethylene and/or at least one C4 to C20 α-olefin, and
   (iii) optionally a non-conjugated diene
wherein the weight ratio of polypropylene matrix (M-PP) and the elastomeric copolymer (EP) is 60:40 to 90:10, preferably 70:30 to 85:15.

Accordingly a heterophasic polypropylene (H-PP1) according to the present invention is an intimate mixture of the polypropylene matrix (M-PP) as defined in detail above for the instant composition (C), i.e. for the heterophasic polypropylene composition (H-PP), and amorphous phase dispersed therein. The intimate mixture can be accomplished by melt blending, however it is preferred that the heterophasic polypropylene (H-PP1) is a reactor blend. Such reactor blends are preferably obtained by carrying out an at least two stage process resulting in a multiphase structure with a polypropylene matrix (M-PP) and inclusions therein comprising the elastomeric copolymer (EP1) as a part of the amorphous phase. The exact method to produce such a heterophasic polypropylene (H-PP1) is defined in detail below. Thus the heterophasic polypropylene (H-PP1) of this invention comprises the polypropylene matrix (M-PP) and the elastomeric copolymer (EP1) being (finely) dispersed in said matrix preferably in form of inclusions. The elastomeric copolymer (EP1) is preferably main part of the amorphous phase, i.e. the amorphous inclusions. The heterophasic polypropylene (H-PP1) may additionally comprise to some extent a (crystalline) polymer other then polypropylene, like (crystalline) polyethylene and/or other (crystalline) C4 to C20 α-olefin polymers. The amount of (crystalline) polymer, like polyethylene, part of the dispersed phase is preferably 0 to 10 wt.-%, more preferably 2 to 8 wt.-% based on the total heterophasic polypropylene (H-PP1).

A further characteristic of the elastomeric copolymer (EP1) not mentioned when defining the instant composition (C), i.e. the heterophasic polypropylene composition (H-PP), is its intrinsic viscosity, reflecting the molecular weight and thus the melt viscosity of said component. The xylene cold soluble fraction (XCS) of the heterophasic polypropylene (H-PP1) is dominated by the elastomeric copolymer (EP1). Accordingly the intrinsic viscosity of the elastomeric copolymer (EP1) is reflected by the intrinsic viscosity of the xylene cold soluble fraction (XCS) of the total heterophasic polypropylene (H-PP1). Thus it is preferred that the intrinsic viscosity of the xylene cold soluble fraction (IV of XCS) of the heterophasic polypropylene (H-PP1) is equal or below 4.0 dl/g. In a preferred embodiment the intrinsic viscosity is in the range of 1.0 to 6.0 dl/g, still more preferred in the range of 1.5 to 4.5 dl/g. The intrinsic viscosity is measured according to ISO 1628 in decaline at 135° C.

Further it is preferred that the heterophasic polypropylene (H-PP1), more precisely the polypropylene matrix (M-PP) and the elastomeric copolymer (EP1), has units derived from C2 to C20 α-olefins other than propylene, preferably derived from ethylene, is more than 7.0 wt.-%, more preferably is more than 10.0 wt.-%, yet more preferably is more than 12.0 wt.-%. Accordingly it is desired that the heterophasic polypropylene (H-PP1) has units derived from C2 to C20 α-olefins other than propylene, preferably derived from ethylene, is in the range of 7 to 30 wt.-%, preferably in the range of 10 to 25 wt.-%.

Moreover it is appreciated that the $MFR_2$ (230° C.) of the heterophasic polypropylene (H-PP1) is in a range of 1.0 to 30.0 g/10 min, more preferably of 2.0 to 20.0 g/10 min, still more preferably of 2.5 to 12.0 g/10 min The xylene cold soluble fraction (XCS) of the heterophasic polypropylene (H-PP1) can be rather high, i.e. up to 40 wt.-%. Accordingly in a preferred embodiment the xylene cold soluble fraction (XCS) of the heterophasic polypropylene (H-PP1) is preferably in the range of 5 to 40 wt.-%, like 7 to 30 wt.-%.

Thus in a very specific process the instant composition (C), i.e. the heterophasic polypropylene composition (H-PP), is produced by applying the following steps of (1.1) polymerizing propylene and optionally further comonomer(s) as defined above, preferably ethylene, in at least one reactor, preferably in one or more bulk reactor(s), preferably loop reactor, and/or in one or more gas phase reactor (s), wherein the reactors are typically connected in series, to obtain the propylene copolymer (M-PP), (1.2) transferring said propylene copolymer (M-PP) in a further reactor, preferably a gas phase reactor, (1.3) producing the elastomeric copolymer (EP1) by polymerizing propylene and further comonomer(s) as defined above, preferably ethylene, in the presence of said propylene copolymer (M-PP) to obtain the elastomeric copolymer (EP1) dispersed in said propylene polymer (M-PP), i.e. leading to the heterophasic polypropylene (H-PP1), (1.4) removing said heterophasic polypropylene (H-PP1) from the reactor and transferring it to an mixing device, preferably to an extruder or to an injection molding device, (2.a) either adding to said heterophasic polypropylene (H-PP1) via the mixing device, i.e. via the extruder or via the injection molding device, the composition (MB), i.e. the masterbatch, said composition (MB) comprises the filler (F), (2.b) or adding to said heterophasic polypropylene (H-PP1) via the mixing device, i.e. via the extruder or via the injection molding device, the composition (MB), i.e. the masterbatch, and the filler (F) separately, preferably separately via different conduit lines, (3) mixing the components in the device, i.e. in the extruder or in the injection molding device, and discharging the obtained instant composition (C), i.e. the heterophasic polypropylene composition (H-PP), All reactors of steps (1.1) to (1.3) are preferably connected in series.

The polymerization can be carried out in the presence of a metallocene catalyst or Ziegler-Natta-type catalyst, the latter is in particular preferred.

A Ziegler-Natta type catalyst typically used in the present invention for propylene polymerization is a stereospecific, high yield Ziegler-Natta catalyst comprising as essential components Mg, Ti, Al and Cl. These type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self supported, i.e. the catalysts are not supported on an external support, but are prepared via emulsion-solidification method.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used.

The cocatalyst used in combination with the transition metal compound typically comprises an aluminium alkyl compound. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Preferably the catalyst also comprises an external electron donor. Suitable electron donors known in the art include ethers, ketones, amines, alcohols, phenols, phosphines and silanes. Silane type exernal donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/

029112, WO 92/19659, WO 92/19653, WO 92/19658, U.S. Pat. Nos. 4,382,019, 4,435,550 ,4,465,782, 4,473,660, 4,560,671, 5,539,067, 5,618,771, EP45975, EP45976, EP45977, WO 95/32994, U.S. Pat. Nos. 4,107,414, 4,186, 107, 4,226,963, 4,347,160, 4,472,524, 4,522,930, 4,530,912, 4,532,313, 4,657,882, 4,581,342, 4,657,882.

In the present invention a Ziegler Natta catalyst, e.g. an inorganic halide (e.g. $MgCl_2$) supported titanium catalyst or self supported solid Ziegler Natta catalysts, together with an aluminium alkyl (e.g. triethylaluminium) cocatalyst are preferably employed. Silanes, e.g. dicyclopentanedimethoxysilane (DCPDMS) or cyclohexylmethyldimethoxysilane (CHMDMS), may be typically used as external donors. The catalyst in the second polymerization stage is typically the same that is used in the first polymerization stage.

According to a preferred embodiment, the heterophasic polypropylene (H-PP1) is produced in a reactor system comprising at least one bulk reaction zone including at least one bulk reactor and at least one gas phase reaction zone including at least one gas phase reactor. The polymerization of propylene copolymer (M-PP), i.e. the matrix of the heterophasic polypropylene (H-PP1), is preferably carried out in a loop reactor and in at least one gas phase reactor, i.e. in one or two gas phase reactor(s).

Hydrogen can be used in different amounts as a molar mass modifier or regulator in any or every reactor in the first (polymerization of propylene copolymer (M-PP)) and second polymerization stage (polymerization of elastomeric copolymer (EP1)).

A separation stage can be employed between the reaction zones to prevent the carryover of reactants from the first polymerization stage into the second one.

In addition to the actual polymerization reactors used, the polymerization reaction system can also include a number of additional reactors, such as pre-reactors. The pre-reactors include any reactor for pre-activating and/or pre-polymerizing the catalyst with propylene and/or other α-olefin(s), like ethylene, if necessary. All reactors in the reactor system are preferably arranged in series.

The high density polyethylene (HDPE) as defined in the instant invention may be produced by blending two or more monomodal polyethylenes having differently centred maxima in their MWDs or having different comonomer content.

Alternatively and preferably the high density polyethylene (HDPE) may be produced by polymerization using conditions which create a bimodal or multimodal polymer product, using for instance a catalyst system or mixture with two or more different catalytic sites, using two or more stage polymerization process with different process conditions in the different stages (e. g. different temperatures, pressures, polymerization media, hydrogen partial pressures, comonomer content etc).

Such a high density polyethylene (HDPE) may be produced relatively simply by a multistage ethylene polymerization, e. g. using a series of reactors, with comonomer addition in only the reactor (s) used for production of the higher/highest molecular weight component (s). Examples of high density polyethylene (HDPE) production are given in EP 0 778 289 and WO 92/12182.

If an ethylene homopolymer component is produced by slurry polymerization involving use of recycled diluent, that diluent may contain small amounts of higher α-olefins as contaminants. Likewise where an earlier polymerization stage has produced an ethylene copolymer component, small amounts of comonomer may be carried over to an ethylene homo-polymerization stage.

Accordingly, by ethylene homopolymer is meant herein a polymer containing at least 99.9% by weight of ethylene units. Likewise as in a multistage/multireactor polymerization using more than one catalyst system, the homo-polymerization catalysts may be at least partially active during the copolymerization reaction, any copolymer component making up less than 5 wt.-% of the total polymer shall not be considered to be the lowest molecular weight component in an high density polyethylene (HDPE) according to the invention.

The polymerization reactions used to produce the high density polyethylene (HDPE) may involve conventional ethylene homo-polymerization or copolymerization reactions, e. g. gas-phase, slurry phase, liquid phase polymerizations, using conventional reactors, e. g. loop reactors, gas phase reactors, batch reactors etc. (see for example WO 97/44371 and WO 96/18662). The catalyst systems used may likewise be any conventional systems, e. g. chromium catalysts, Ziegler-Natta and metallocene or metallocene: aluminoxane catalysts, either homogeneous or more preferably heterogeneous catalysts, e. g. catalysts supported on inorganic or organic particulates, in particular on magnesium halides or inorganic oxides such as silica, alumina or silica-alumina. For the preparation of the high molecular weight component in particular it is especially desirable to use supported Ziegler-Natta catalysts as the molecular weight can then conveniently be controlled using hydrogen. It is also possible to use supported metallocene catalysts as it is particularly straightforward to select desired molecular weights by appropriate selection of particular metallocenes. The metallocenes used will typically be group IVa to VIa metals (in particular Zr or Hf) complexed by optionally substituted cyclopentadienyl groups, e. g. groups carrying pendant or fused substituents optionally linked together by bridging groups. Suitable metallocenes and aluminoxane cocatalysts are widely described in the literature, e. g. the patent publications of Borealis, Hoechst, Exxon, etc.

Typically and preferably however the high density polyethylene (HDPE) will be prepared using multistage polymerization using a single catalyst system or a plurality of catalyst systems, e. g. two or more metallocenes, one or more metalWocenes and one or more Ziegler-Natta catalysts, two or more chromium catalysts, one or more chromium catalysts and one or more Ziegler-Natta catalysts, etc. Especially preferably the same catalyst system is used in the different polymerization stages, e. q. a catalyst system as described in EP 0 688 794.

The elastomeric copolymer (EP2) may be manufactured or synthesized by using a variety of techniques. For example, these copolymers can be synthesized by employing solution, slurry, or gas phase polymerization techniques that employ various catalyst systems including Ziegler-Natta systems including vanadium catalysts and take place in various phases such as solution, slurry, or gas phase. Exemplary catalysts include single-site catalysts including constrained geometry catalysts and Group IV-VI metallocenes, and Brookhart catalysts. Elastomeric copolymers are commercially available under the tradenames Vistalon, like Vistalon 606, (ExxonMobil, USA), Keltan (DSM Elastomers, NL), Nordel (Dow Chemical, USA), NORDEL MG. (Dow Chemical, USA), Royalene, like Royalene 501, (Lion Copolymer LLC, USA), Buna EP (Lanxess AG, DE) and Dutral (Polimeri Europa, IT).

Usual amounts of auxiliary substances apart from the filler (F), which may range from 0.01 to 2.5 wt.-% of stabilizers, 0.01 to 1 wt.-% of processing aids, 0.1 to 1 wt.-% of antistatic agents, and 0.2 to 3 wt.-% of pigments, in each case based on the sum of the instant composition (C), may be added.

The final composition (C), i.e. said heterophasic polypropylene composition (H-PP), (preferably in pellet form) is then preferably used to form articles, like injection molded articles. Thus the final composition (C), i.e. said heterophasic polypropylene composition (H-PP), (preferably in pellet form) is especially used to form automotive articles, like bumpers, side trims, step assists, body panels, spoilers, dashboards, interior trims and the like.

The present invention is further directed to the use of the high density polyethylene (HDPE) or the composition (MB), i.e. the masterbatch, as defined in the instant invention to improve the toughness at low temperatures, for example expressed by the impact resistance measured according to ISO 179 at these low temperatures, i.e. at temperatures below −20° C., preferably below −30° C., like at −40° C., of a heterophasic polypropylene, preferably of the heterophasic polypropylene (H-PP1) as defined in the present invention.

Thus the present invention is in particular directed to the use of the high density polyethylene (HDPE) or the composition (MB), i.e. the masterbatch, to improve the impact resistance of a heterophasic polypropylene, like the heterophasic polypropylene (H-PP1), the improvement is defined by 1.2<[(HECO+MB)/HECO], more preferably 1.3<[(HECO+MB)/HECO], like 1.4<[(HECO+MB)/HECO], wherein
HECO+MB is the impact resistance measured according to ISO 294-1 at −40° C. of a heterophasic polypropylene, like the heterophasic polypropylene (H-PP1), as to which the high density polyethylene (HDPE) or the composition (MB), i.e. the masterbatch, is mixed and
HECO is the impact resistance measured according to ISO 294-1 at −40° C. of same heterophasic polypropylene, like the heterophasic polypropylene (H-PP1), as used in HECO+MB, but without any addition of the high density polyethylene (HDPE) or the composition (MB), i.e. the masterbatch.

Considering the above information the present invention is in particular directed to the following embodiments:
[Prargraph 1] Composition (C) comprising
(a) a polypropylene matrix (M-PP),
(b) at least one elastomeric copolymer (EP) comprising units derived from
  (i) ethylene,
  (ii) at least one C3 to C20 α-olefin, and
  (iii) optionally a non-conjugated diene;
(c) a high density polyethylene (HDPE) being bimodal or multimodal, and
(d) an inorganic filler (F).
[Prargraph 2] Composition (C) according to [Prargraph 1], wherein
(a) the elastomeric copolymer(s) (EP), the high density polyethylene (HDPE) and the filler (F) are dispersed in said polypropylene matrix (M-PP) and/or
(b) the xylene soluble (XS) content in the composition (C) is at least 12 wt.-% based on the total composition (C).
[Prargraph 3] Composition (C) according to [Prargraph for 2], wherein the composition (C) comprises
(a) 36 to 81 wt.-% of the polypropylene matrix (M-PP),
(b) 6 to 72 wt.-% of elastomeric copolymer(s) (EP),
(c) 3 to 27 wt.-% of the high density polyethylene (HDPE), and
(d) 5 to 20 wt.-% of the inorganic filler (F).
[Prargraph 4] Composition (C) according to any one of the preceding [Prargraphs 1 to 3], wherein the composition (C) comprises an elastomeric copolymer (EP1) and an elastomeric copolymer (EP2),
(a) said elastomeric copolymer (EP2) has a higher ethylene content than the elastomeric copolymer (EP1) and
(b) said elastomeric copolymer (EP1) is present within the composition (C) from 4 to 36 wt.-% and said elastomeric copolymer (EP2) is present within the composition (C) from 2 to 36 wt.-%.
[Prargraph 5] Composition (C) according to any one of the preceding [Prargraphs 1 to 4], wherein
(a) the amount of units derived from ethylene within the elastomeric copolymer (EP1) is in the range of 20 to 70 wt.-% and/or
(b) the amount of units derived from ethylene within the elastomeric copolymer (EP2) is more than 50 wt.-%.
[Prargraph 6] Composition (C) according to any one of the preceding [Prargraphs 1 to 5], wherein the weight ratio of the high density polyethylene (HDPE) and the sum of the elastomeric copolymers (EP) is from 1:10 to 2:1.
[Prargraph 7] Composition (C) according to any one of the preceding [Prargraphs 1 to 6], wherein
(a) the polypropylene matrix (M-PP) is a propylene homopolymer and/or
(b) the elastomeric copolymer(s) (EP) are an ethylene propylene rubber (EPR) and/or an ethylene propylene diene monomer polymer (EPDM).
[Prargraph 8] Composition (C) according to any one of the preceding [Prargraphs 1 to 7], wherein the high density polyethylene (HDPE)
(a) has a melt flow rate $MFR_2$ (190° C.) measured according to ISO 1133 of 0.1 to 7.0 g/10 min and/or
(b) has a melt flow rate ratio FRR ($MFR_{21}$ (190° C.)/$MFR_2$ (190° C.)) of 20 to 150 and/or
(c) comprises a fraction (A) and a fraction (B),
  (i) said fraction (A) has a lower weight average molecular weight $M_w$ measured according to ISO 16014 and/or a lower melt flow rate $MFR_2$ (190° C.) measured according to ISO 1133 as said fraction (B), and
  (ii) the weight ratio between the fraction (A) and the fraction (B) ranges from 70:30 to 30:70.
[Prargraph 9] Composition (C) according to any one of the preceding [Prargraphs 1 to 8], wherein
(a) said fraction (A) has
  (i) weight average molecular weight $M_w$ measured according to ISO 16014 from 10,000 to 50,000 g/mol and/or
  (ii) a melt flow rate $MFR_2$ (190° C.) measured according to ISO 1133 from 50 to 1,000 g/10 min, and/or
  (iii) a density measured according to ISO 1183-187 from 950 to 980 kg/m³, and
(b) said fraction (B) has
  (i) a weight average molecular weight $M_w$ measured according to ISO 16014 from 75,000 to 500,000 g/mol, and/or
  (ii) a melt flow rate $MFR_2$ (190° C.) measured according to ISO 1133 from 0.01 to 1.00 g/10 min, and/or
  (iii) a density measured according to ISO 1183-187 from 920 to 950 kg/m³.

[Prargraph 10] Composition (MB) comprising
(a) an elastomeric copolymer (EP) comprising units derived from
  (i) ethylene,
  (ii) at least one C3 to C20 α-olefin, and
  (iii) optionally a non-conjugated diene;
and
(b) a high density polyethylene (HDPE) being bimodal or multimodal,
wherein the elastomeric copolymer (EP) and the high density polyethylene (HDPE) together constitute at least 85 wt.-% of the composition (MB).

[Prargraph 11] Composition (MB) according to [Prargraphs 10], wherein the elastomeric copolymer (EP) is the elastomeric copolymer (EP2) as defined in any one of the preceding [Prargraphs 1 to 9] and the high density polyethylene (HDPE) is further defined by any one of the preceding [Prargraphs 1 to 9].

[Prargraph 12] Composition (MB) according to [Prargraph 10 or 11], wherein the weight ratio of the high density polyethylene (HDPE) and the elastomeric copolymer is from 60:40 to 90:10.

[Prargraph 13] Use of a composition (MB) according to any one of the preceding [Prargraphs 10 to 12] to improve the impact resistance of a heterophasic polypropylene, the improvement is defined by $$1.2 < [(HECO+MB)/HECO]$$

wherein

HECO+MB is the impact resistance measured according to ISO 294-1 at −40° C. of a heterophasic polypropylene as to which the composition (MB) as defined in any one of the preceding [Prargraphs 10 to 12] is mixed and HECO is the impact resistance measured according to ISO 294-1 at −40° C. of same heterophasic polypropylene as used in HECO+MB, but without any addition of the composition (MB) as defined in any one of the preceding [Prargraphs 10 to 12].

[Prargraph 14] Process for the preparation of a composition (C) as defined in any one of the preceding claims 1 to 9, wherein (a) a heterophasic polypropylene (H-PP) comprising
  (i) a polypropylene matrix (M-PP) as defined in any one of the [Prargraphs 1 to 9] and
  (ii) an elastomeric copolymer (EP), preferably an elastomeric copolymer (EP1), as defined in any one of the [Prargraphs 1 to 9] and being dispersed in said matrix (M-PP);
(b) a composition (MB) as defined in any one of the [Prargraphs 10 to 12]; and
(c) an inorganic filler (F) are mixed, preferably melt mixed, together.

[Prargraph 15] Process according to [Prargraph 14], wherein
(a) 40 to 90 wt.-% of the heterophasic polypropylene (H-PP);
(b) 5 to 45 wt.-% of the composition (MB); and
(c) 5 to 20 wt.-% of the inorganic filler (F)
are mixed, preferably melt mixed, together.

[Prargraph 16] Article, preferably an injection molded article, comprising a composition (C) according to any one of the preceding [Prargraphs 1 to 9].

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}$C NMR Spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Density is measured according to ISO 1183-187. Sample preparation is done by compression molding in accordance with ISO 1872-2:2007.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load).

$MFR_2$ (190° C.) is measured according to ISO 1133 (190° C., 2.16 kg load).

$MFR_{21}$ (190° C.) is measured according to ISO 1133 (190° C., 21.6 kg load).

Melt flow rate ratio FRR is defined as the ratio $MFR_{21}$ (190° C.)/$MFR_2$ (190° C.)

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 cm$^{-1}$. Quantitative results are obtained based upon reference to the film thickness.

Intrinsic viscosity is measured according to DIN ISO 1628/1, October 1999 (in Decalin at 135° C.).

Flexural Modulus: The flexural modulus was determined in 3-point-bending according to ISO 178 on injection molded specimens of 80×10×4 mm prepared in accordance with ISO 294-1:1996.

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from +23 to +80° C. at a heating rate of 1° C./min Charpy impact test: The Charpy notched impact strength (Charpy NIS) is measured according to ISO 179 2C/DIN 53453 at 23° C., −20° C. and −40° C., using injection molded bar test specimens of 50×6×4 mm³ prepared in accordance with ISO 294-1:1996.

Crystallization Temperature Tc

Crystallization temperature is determined by differential scanning calorimetry (DSC) measurement according to ISO 11357-1,2,3 at a cooling rate of 10 K/min after a first heating to 200° C.

Melting Temperature Tm

Melting temperature (peak temperature) Tm was measured by DSC according to ISO 11357-1,2,3 using the peak temperature in the second heat in a heat-cool-heat cycle with a rate of 10 K/min between ambient temperature and 210° C.

Glass transition point: The glass transition points were measured using dynamic-mechanical analysis according to ISO 6721-7 on compression molded plaques of 1 mm thickness, prepared in accordance with ISO 1877-2:2007.

The xylene solubles (XCS, wt.-%): Content of Xylene solubles (XCS) is determined at 23° C. according ISO 6427.

Particle size d95 is calculated from the particle size distribution as determined by laser diffraction according to ISO 13320-1:1999.

Surface area is determined as the BET surface according to ISO 787-11 with nitrogen ($N_2$).

2. Examples

H-PP1 is the commercial product KSR4542 of Borealis and is a heterophasic polypropylene with a $MFR_2$ (230° C.) of 7 g/10 min, a density of 905 kg/m³, a xylene soluble content of 25 wt.-%, an intrinsic viscosity of the XS-fraction of 2.8 dl/g; the matrix of the heterophasic polypropylene is a propylene homopolymer and the elastomer phase has a glass transition point of −48° C.

EPR-MB is the commercial product Dutral PM 06 of Polimeri Europa and is a masterbatch containing 34 wt.-% of an unimodal polyethylene and 66 wt.-% of an ethylene propylene rubber with an ethylene content of 60 wt.-%, said masterbatch has a $MFR_2$ (230° C.) of 1.8 g/10 min and a density of 940 kg/m³, the EPR component having a glass transition point of −56° C., EPR2 is the commercial product Vistalon 606 of Exxon-Mobil and is an ethylene propylene rubber with an ethylene content of 54 wt.-%, a density of 865 kg/m³, and a glass transition point of −55° C., EPDM2 is the commercial product Royalene 501 of Lion Copolymer LLC and is an ethylene propylene diene monomer polymer (EPDM) with an ethylene content of 57 wt.-%, diene content of 3.8 wt.-%, a density of 860 kg/m³, and a glass transition point of −58° C., HDPE1 is the commercial product MB6562 of Borealis and is a bimodal high density polyethylene with a $MFR_2$ (190° C.) of 1.5 g/10 min, a $MFR_{21}$ (190° C.) of 97 g/10 min, a density of 951 kg/m³, HDPE2 is the commercial product FB 1460 of Borealis and is a bimodal high density polyethylene with a $MFR_2$ (190° C.) of 0.2 g/10 min, a $MFR_{21}$ (190° C.) of 6.0 g/10 min, a density of 946 kg/m³, MB1 is an extruder-blended mixture of 65 wt.-% of EPR2 and 35 wt.-% HDPE1

MB2 is an extruder-blended mixture of 65 wt.-% of EPR2 and 35 wt.-% HDPE2

MB3 is an extruder-blended mixture of 65 wt.-% of EPDM2 and 35 wt.-% HDPE2

CB is the commercial product Plasblak PE4103 of Cabot Corp and is an masterbatch of polyethylene with 30 wt.-% carbon black and an $MFR_2$ (190° C.) of 8 g/10 min, Filler is the commercial product Luzenac A20 of Luzenac and is a talcum with a particle size distribution d95 of 20 μm and a specific surface area of 6.5 m²/g.

TABLE 1

Properties of the reference examples

|  |  | CE 1 | CE 2 | CE 3 | CE 4 |
|---|---|---|---|---|---|
| H-PP1 | [wt %] | 78 | 63 | 58 | 100 |
| EPR-MB | [wt %] | 10 | 15 | 20 | — |
| CB | [wt %] | 2 | 2 | 2 | — |
| Filler | [wt %] | 20 | 20 | 20 | — |
| $MFR_2$ (230° C.) | [g/10 min] | 4.9 | 4.2 | 4.0 | 7 |
| Impact strength at 23° C. | kJ/m² | 28.3 | 31.0 | 32.4 | 28 |
| Impact strength at −20° C. | kJ/m² | 10.7 | 13.7 | 24.4 | 7 |
| Impact strength at −40° C. | kJ/m² | 5.9 | 8.0 | 8.1 | 5.5 |
| Flexural Modulus | MPa | 1182 | 1063 | 939 | 860 |
| CLTE | μm/m · K | 78.0 | 73.2 | 64.7 | 102.5 |

TABLE 2

Properties of the inventive examples

|  |  | E1 | E2 | E3 | E4 | E5 |
|---|---|---|---|---|---|---|
| H-PP1 | [wt %] | 78 | 63 | 58 | 78 | 63 |
| MB1 | [wt %] | 10 | 15 | 20 |  |  |
| MB2 | [wt %] |  |  |  | 10 | 15 |
| CB | [wt %] | 2 | 2 | 2 | 2 | 2 |
| Filler | [wt %] | 20 | 20 | 20 | 20 | 20 |
| $MFR_2$ (230° C.) | [g/10 min] | 4.9 | 4.3 | 3.6 | 4.4 | 3.6 |
| Impact strength at 23° C. | kJ/m² | 29.6 | 31.6 | 31.6 | 30.7 | 31.3 |
| Impact strength at −20° C. | kJ/m² | 7.6 | 18.3 | 27.5 | 8.3 | 20.3 |
| Impact strength at −40° C. | kJ/m² | 5.9 | 6.4 | 12.4 | 6.0 | 6.1 |
| Flexural Modulus | MPa | 1110 | 1086 | 921 | 1140 | 974 |
| CLTE | μm/m • K | 78.8 | 84.5 | 74.9 | 79.5 | 78.2 |

TABLE 3

Properties of the inventive examples

|  |  | E 6 | E 7 | E 8 | E 9 |
|---|---|---|---|---|---|
| H-PP1 | [wt %] | 58 | 78 | 63 | 58 |
| MB2 | [wt %] | 20 |  |  |  |
| MB3 | [wt %] |  | 10 | 15 | 20 |
| CB | [wt %] | 2 | 2 | 2 | 2 |
| Filler | [wt %] | 20 | 20 | 20 | 20 |
| $MFR_2$ (230° C.) | [g/10 min] | 3.2 | 7.0 | 5.5 | 5.4 |
| Impact strength at 23° C. | kJ/m² | 30.2 | 24.5 | 27.2 | 28.9 |
| Impact strength at −20° C. | kJ/m² | 33.2 | 6.2 | 10.4 | 32.8 |
| Impact strength at −40° C. | kJ/m² | 17.4 | 4.4 | 4.8 | 9.8 |
| Flexural Modulus | MPa | 903 | 1146 | 967 | 724 |
| CLTE | μm/m · K | 86.9 | 87.1 | 78.4 | 76.9 |

The invention claimed is:

1. Composition (MB) comprising:
   (a) an elastomeric copolymer (EP2) comprising units derived from
      (i) ethylene,
      (ii) at least one C3 to C20 α-olefin, and
      (iii) optionally a non-conjugated diene; and
   (b) a high density polyethylene (HDPE) being bimodal or multimodal, wherein
      (i) the elastomeric copolymer (EP2) and the high density polyethylene (HDPE) together constitute at least 85 wt.-% of the composition (MB), and (ii) the weight ratio of the high density polyethylene (HDPE) and the elastomeric copolymer is from 50:50 to 35:65, and-wherein the content of units derivable from the ethylene in the elastomeric copolymer (EP2) ranges from 50.0 to 70.00 wt. %.

2. Composition (MB) according to claim 1, wherein the elastomeric copolymer(EP2) is an ethylene propylene rubber (EPR) and/or an ethylene propylene diene monomer polymer (EPDM).

3. Composition (MB) according to claim 1, wherein the high density polyethylene (HDPE):
   (a) has a melt flow rate $MFR_2$ (190 ° C.) measured according to ISO 1133 of 0.1 to 7.0 g/10min and/or
   (b) has a melt flow rate ratio FRR ($MFR_{21}$ (190 ° C.)/$MFR_2$ (190 ° C.)) of 20 to 150 and/or
   (c) comprises a fraction (A) and a fraction (B),
      (i) said fraction (A) has a lower weight average molecular weight $M_w$ measured according to ISO 16014 and/or a lower melt flow rate $MFR_2$ (190 ° C.) measured according to ISO 1133 than said fraction (B), and
      (ii) the weight ratio between the fraction (A) and the fraction (B) ranges from 70:30 to 30:70.

* * * * *